US011731547B2

(12) United States Patent
Kim et al.

(10) Patent No.: US 11,731,547 B2
(45) Date of Patent: Aug. 22, 2023

(54) VEHICLE SEAT HAVING LEGREST WITH SEAT CUSHION FUNCTION

(71) Applicants: HYUNDAI MOTOR COMPANY, Seoul (KR); KIA CORPORATION, Seoul (KR); DAS CO., LTD., Gyeongju-si (KR)

(72) Inventors: Sang Ho Kim, Incheon (KR); Dong Woo Jeong, Gwacheon-si (KR); Seon Chae Na, Yongin-si (KR); Dong Man Lee, Suwon-si (KR)

(73) Assignees: Hyundai Motor Company, Seoul (KR); Kia Corporation, Seoul (KR); DAS Co Ltd, Gyeongju-si (KR)

( * ) Notice: Subject to any disclaimer, the term of this patent is extended or adjusted under 35 U.S.C. 154(b) by 0 days.

(21) Appl. No.: 17/534,935

(22) Filed: Nov. 24, 2021

(65) Prior Publication Data
US 2022/0388435 A1 Dec. 8, 2022

(30) Foreign Application Priority Data

Jun. 3, 2021 (KR) .......................... 10-2021-0072182

(51) Int. Cl.
*B60N 2/90* (2018.01)
*B64D 11/06* (2006.01)
*B60N 2/02* (2006.01)

(52) U.S. Cl.
CPC .............. *B60N 2/995* (2018.02); *B60N 2/02* (2013.01); *B64D 11/0643* (2014.12); *B60N 2002/0212* (2013.01)

(58) Field of Classification Search
CPC ....... B60N 2/995; B60N 2/22; B64D 11/0643
See application file for complete search history.

(56) References Cited

U.S. PATENT DOCUMENTS

| 2,217,352 A | * | 10/1940 | Todd ..................... | A47C 7/5066 297/367 R |
| 2,284,129 A | * | 5/1942 | Caesar .................... | A47C 7/506 297/368 |
| 2,602,490 A | * | 7/1952 | Earl ........................ | B61D 33/005 297/423.15 |
| 3,462,194 A | * | 8/1969 | Gielow ................... | A47C 7/506 297/423.15 |
| 3,936,093 A | * | 2/1976 | Hogan ................... | B64D 11/0643 297/423.15 |
| 5,312,155 A | * | 5/1994 | Akima ................... | B60N 3/063 297/180.13 |

(Continued)

FOREIGN PATENT DOCUMENTS

| CN | 202782757 U | * | 3/2013 | ............. A61H 15/00 |
| CN | 108973812 A | * | 12/2018 | ........... A61H 23/006 |

(Continued)

*Primary Examiner* — Timothy J Brindley
(74) *Attorney, Agent, or Firm* — Morgan, Lewis & Bockius LLP

(57) ABSTRACT

The present disclosure provides a vehicle seat having a legrest with a seat cushion function, which may mount a legrest on a back portion of a front seatback to be deployable such that a passenger seated on a rear seat may place and support a calf and a foot on the deployed legrest, and recline a front seatback forward to use the deployed legrest as a seat cushion on which the passenger may be seated while facing a passenger seated on the rear seat.

10 Claims, 6 Drawing Sheets

(56) References Cited

U.S. PATENT DOCUMENTS

| | | | | |
|---|---|---|---|---|
| 6,375,266 | B1* | 4/2002 | Ferguson | B60N 3/063 |
| | | | | 297/423.26 |
| 7,950,743 | B2* | 5/2011 | Clausen | B64D 11/064 |
| | | | | 297/423.27 |
| 9,744,894 | B2* | 8/2017 | Carlioz | B64D 11/06 |
| 2008/0296957 | A1* | 12/2008 | Clough | B64D 11/0643 |
| | | | | 297/423.15 |
| 2009/0302158 | A1 | 12/2009 | Darbyshire et al. | |
| 2015/0183345 | A1* | 7/2015 | Ketels | A61H 15/00 |
| | | | | 297/217.1 |
| 2018/0170551 | A1* | 6/2018 | Newell | B64D 11/0643 |
| 2020/0139861 | A1* | 5/2020 | Nevarez | B60N 3/06 |
| 2021/0068549 | A1* | 3/2021 | Clough | B64D 11/0643 |

FOREIGN PATENT DOCUMENTS

| | | | | |
|---|---|---|---|---|
| CN | 113911003 | A * | 1/2022 | |
| DE | 102009005016 | A1 * | 8/2009 | ........... B60N 2/4495 |
| DE | 102011109630 | A1 * | 2/2013 | ........... B60N 2/4495 |
| DE | 102012223380 | A1 * | 6/2014 | ........... B60N 2/448 |
| EP | 3034404 | A1 * | 6/2016 | ........... B60N 3/063 |
| EP | 3335931 | A1 * | 6/2018 | .............. B60N 3/06 |
| JP | 3543355 | B2 | 7/2004 | |
| JP | 2010-179724 | A | 8/2010 | |
| KR | 20-1997-0032096 | | 7/1997 | |
| KR | 10-1999-0031047 | A | 7/1999 | |
| KR | 10-1999-0074038 | A | 10/1999 | |
| WO | WO-2015134587 | A1 * | 9/2015 | ............... B60N 2/22 |

\* cited by examiner

VEHICLE SEAT HAVING LEGREST WITH SEAT CUSHION FUNCTION

CROSS-REFERENCE TO RELATED APPLICATION

This application claims the benefit of priority to Korean Patent Application No. 10-2021-0072182 filed on Jun. 3, 2021 in the Korean Intellectual Property Office, the entire contents of which are incorporated herein by reference.

TECHNICAL FIELD

The present disclosure relates to a vehicle seat having a legrest with a seat cushion function, and more specifically, to a vehicle seat with a new structure in which a legrest with a seat cushion function is mounted on a back portion of a front seatback to be deployable.

BACKGROUND

Generally, a vehicle seat is manufactured in a structure basically including a seat cushion for seating, a seatback for leaning a back, and a headrest for supporting a neck and a head, but a seat mechanism capable of freely changing a posture suitable for a body type and a situation of a passenger or the like is also combined therewith.

In particular, a seat for an autonomous vehicle to be released in the future requires the mounting of a seat mechanism that a passenger may implement a desired posture for conversation between passengers, resting, sleeping, or the like.

For example, when an operation of reclining the seatback backward, a tilting operation such as lifting a front end of the seat cushion, and an operation of deploying a legrest mounted on the front end of the seat cushion are performed together, it is possible to implement a seat position capable of taking a comfortable resting posture while distributing a body pressure of the passenger as much as possible.

In a state where the legrest mounted on the seat cushion is deployed, the passenger may support the calf portion on the legrest and take a comfortable posture, but may feel discomfort because a foot portion of the passenger is not supported in a floating state.

Rather, when the passenger places and supports the foot portion rather than the calf portion on a specific object in a state of stretching out the leg, it is possible to implement the most comfortable posture.

To this end, when the legrest is manufactured in the form of increasing the length or a separate structure of increasing the length is additionally mounted on the legrest, the foot portion as well as the calf portion of the passenger may be supported thereby, but there is inevitably the constraint due to the limited interior space of the vehicle, and there are problems, such as an increase in the number of related parts, an increase in weight, and an increase in cost.

The above information disclosed in this Background section is only for enhancement of understanding of the background of the disclosure and accordingly it may include information that does not form the prior art that is already known in this country to a person of ordinary skill in the art.

SUMMARY OF THE DISCLOSURE

The present disclosure has been made in an effort to solve the problems associated with related art, and an object of the present disclosure is to provide a vehicle seat having a legrest with a seat cushion function, which may mount a legrest on a back portion of a front seatback to be deployable such that a passenger seated on a rear seat may place and support a calf and a foot on the deployed legrest, and recline a front seatback forward to use the deployed legrest as a seat cushion on which the passenger may be seated while facing a passenger seated on the rear seat.

To achieve the object, the present disclosure provides a vehicle seat having a legrest with a seat cushion function configured to include a support frame having a predetermined height and mounted on a floor panel; a front seat cushion having a seat cushion frame mounted on the support frame so as to be movable forward or backward; a front seatback having a seatback frame connected to the seat cushion frame so as to be reclinable; a legrest support frame connected to a recliner frame disposed under the seatback frame; a legrest frame fastened to the legrest support frame so as to be deployable backward; and a legrest with a seat cushion function mounted on the legrest frame, and mounted on a back portion of the front seatback so as to be deployable.

The vehicle seat having the legrest with the seat cushion function according to an exemplary embodiment of the present disclosure further includes a lever device interlockably connected to a recliner mounted on the recliner frame and a legrest locking device mounted on the legrest support frame, as a means of operating such that operations of unlocking the recliner and the legrest locking device are simultaneously performed, or only an operation of unlocking the legrest locking device is performed.

In particular, the lever device includes a recliner lever having a front end arranged as a free end operable by a user, and a rear end rotatably connected to the recliner; a legrest unlocking first lever having a lower end rotatably connected to the legrest locking device, and an upper end on which a guide pin is disposed; and a connection lever having a front end hinge-connected to the recliner lever, and a rear end including a guide hole that the guide pin is inserted so as to be slidably movable.

Further, a spring configured to provide an elastic restoring force for returning the recliner lever to an original position after the recliner lever is pulled is connected between a rear portion of the recliner lever and the legrest support frame.

Further, the legrest unlocking first lever is integrally formed with a legrest unlocking second lever at a predetermined angle for unlocking only the legrest locking device when the legrest is deployed backward.

Further, a legrest deployment operation lever connected to the legrest unlocking second lever by a cable is mounted on a back portion of the legrest so as to be reclinable.

Preferably, front and back portions of the front seatback have a symmetric shape to each other such that each of the front and back portions of the front seatback has a surface profile against which an upper body of a passenger may lean.

Further, a fixed rail is mounted above the support frame, and a movable rail that is fastened to the fixed rail so as to be movable forward or backward is mounted under the seat cushion frame.

Further, a shield cover covering a seat cushion frame is mounted on a circumferential portion of the front seat cushion.

Preferably, an armrest part having a shape in which a passenger may place an arm is integrally formed on rear portions of both sides of the shield cover.

Through the above configuration, the present disclosure provides the following effects.

First, by mounting the legrest on the back portion of the front seatback to be deployable such that the passenger seated on the rear seat may place and support the foot portion as well as the calf portion on the legrest, it is possible to take the comfortable resting posture while distributing the body pressure as much as possible.

Second, by reclining the front seatback forward to use the deployed legrest as the seat cushion on which the passenger may be seated while facing the passenger seated on the rear seat, it is possible to implement the seat position for the conversation mode with the passenger seated on the rear seat, and to provide the comfortable seating space for infants who need adult protection.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
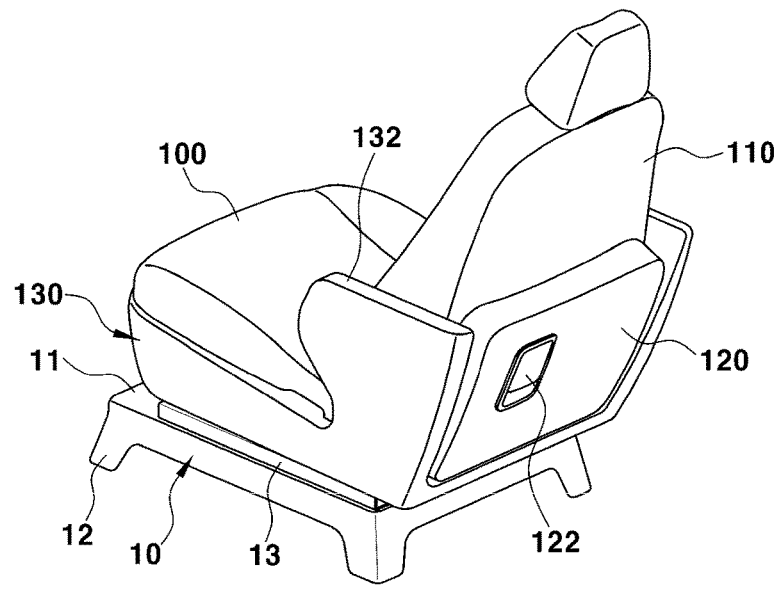
FIG. 1 is a perspective diagram illustrating an appearance of a vehicle seat having a legrest with a seat cushion function according to an exemplary embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, a preferred exemplary embodiment of the present disclosure will be described in detail with reference to the accompanying drawings.

It should be noted that a front seatback among the terms mentioned in the present disclosure means a seatback in a first column seat if a seat is arranged in two columns in a vehicle interior, and means a seatback in a first or second column seat if the seat is arranged in three columns in the vehicle interior.

Figure 2:
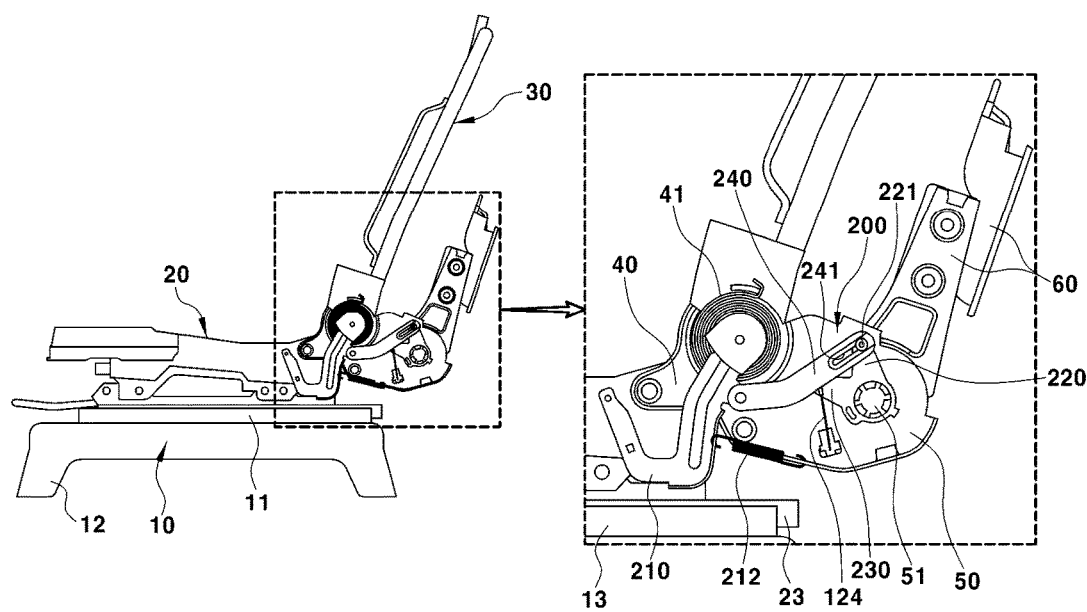
FIG. 2 is a side diagram illustrating an inner structure and a lever device of the vehicle seat having the legrest with the seat cushion function according to an exemplary embodiment of the present disclosure.
Figure 3:
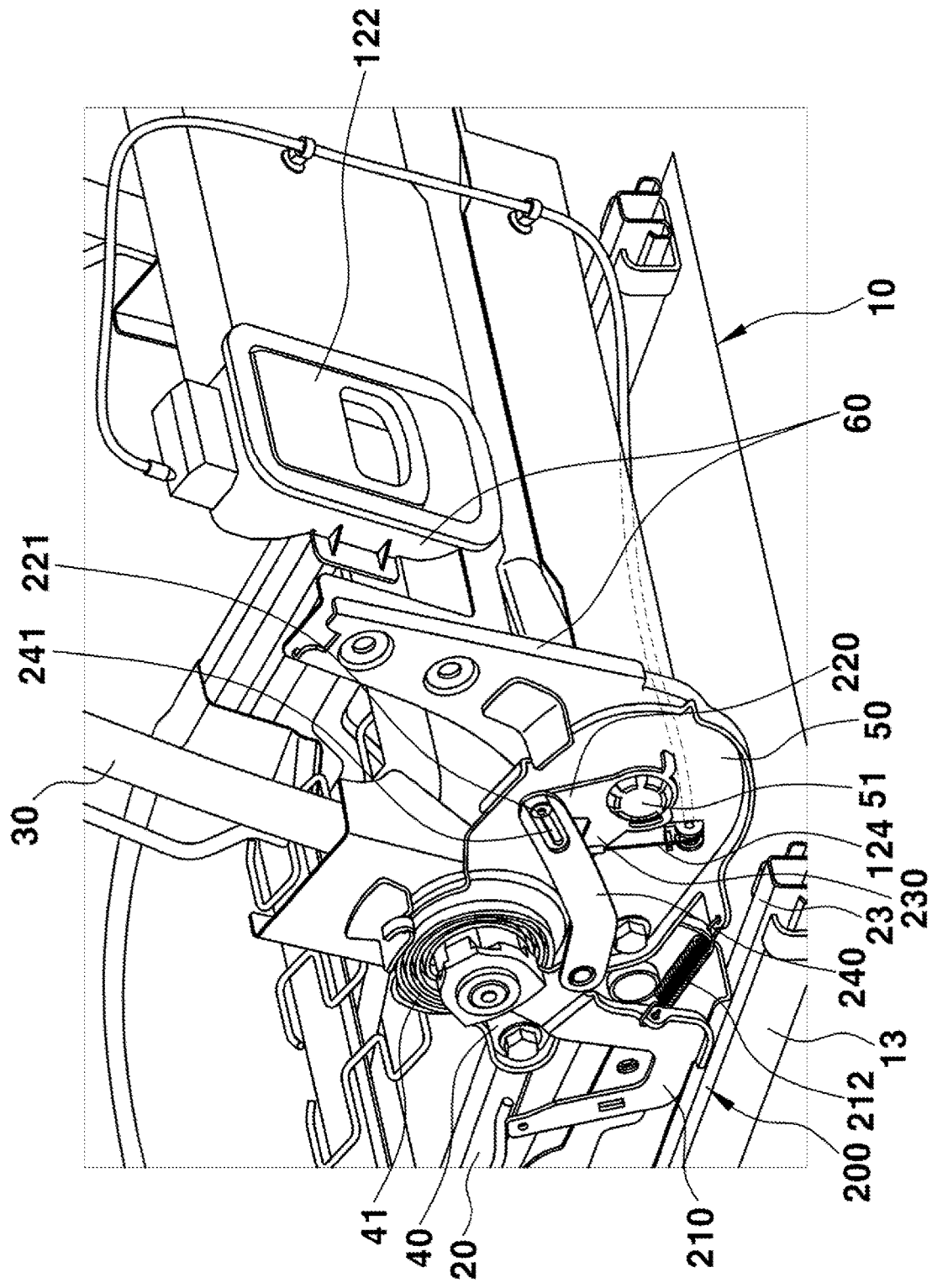
FIG. 3 is a perspective diagram illustrating main portions of the inner structure and the lever device of the vehicle seat having the legrest with the seat cushion function according to an exemplary embodiment of the present disclosure.

FIG. 1 is a perspective diagram illustrating an appearance of a vehicle seat having a legrest with a seat cushion function according to an exemplary embodiment of the present disclosure, FIG. 2 is a side diagram illustrating an inner structure and a lever device of the vehicle seat having the legrest with the seat cushion function according to an exemplary embodiment of the present disclosure, and FIG. 3 is a perspective diagram illustrating main portions of the inner structure and the lever device of the vehicle seat having the legrest with the seat cushion function according to an exemplary embodiment of the present disclosure, in which a reference numeral 10 in each drawing refers to a support frame.

The support frame 10 includes a plate part 11 configured to support a load of the entire seat, and a leg 12 with a predetermined height extending from four corner positions of the plate part 11 downward and mounted on a floor panel.

Preferably, by differently applying the vertical length (height) to the leg 12 of the support frame 10, a desired installation height of the seat may be determined.

The seat cushion frame 20 is mounted on the support frame 10 to be movable forward or backward.

To this end, as illustrated in FIG. 2, a fixed rail 13 is mounted above the support frame 10, and a movable rail 23 fastened to the fixed rail 13 to be movable forward or backward is mounted under the seat cushion frame 20.

The seatback frame 30 is connected to a side portion of the seat cushion frame 20 to be reclinable forward or backward.

To this end, as illustrated in FIG. 2, a recliner frame 40 having a recliner 41 embedded therein is fixed to and mounted on rear ends of both sides of the seat cushion frame 20, and lower ends of both sides of the seatback frame 30 are connected to the recliner 41 to be reclinable.

Therefore, as described above, when the recliner 41 is unlocked, the seatback frame 30 may be reclined forward or backward.

Meanwhile, as illustrated in FIG. 1, a front seat cushion 100 configured to provide a cushioning feel when a lower body of a passenger is seated is mounted on the seat cushion frame 20, and a front seatback 110 configured to provide a cushioning feel to the back and waist portions of the passenger is mounted on the seatback frame 30.

A legrest support frame 50 illustrated in FIG. 2 is integrally connected to rear portions of recliner frames 40 positioned on the lower portions of both sides of the seatback frame 30 while mounted on the rear ends of both sides of the seat cushion frame 20.

Further, a legrest frame 60 is fastened to the legrest support frame 50 to be deployable backward.

At this time, since a legrest locking device 51 configured to unmovably lock the legrest frame 60 is embedded in the legrest support frame 50, the legrest locking device 51 may be provided in various structures as described above, such as a lever-interlinked locking pin constraining a rotation axis of the legrest frame 60.

Further, as illustrated in FIG. 1, a legrest 120 with a seat cushion function configured to provide a cushion support feel to the calf and foot portions of the passenger is mounted on the legrest frame 60.

Therefore, the legrest 120 with the seat cushion function is positioned in a state of closely contacting the back portion of the front seatback 110 when undeployed, and when deployed, the legrest 120 is arranged to be almost perpendicular to the back portion of the front seatback 110.

According to an exemplary embodiment of the present disclosure, as illustrated in FIG. 2, a lever device 200 configured to operate such that operations of unlocking the recliner 41 and the legrest locking device 51 are simultaneously performed, or only the operation of unlocking the legrest locking device 51 is performed is interlockably connected to the recliner 41 mounted under the recliner frame 40 and the legrest locking device 51 mounted on the legrest support frame 50.

To this end, the lever device 200 is configured to include a recliner lever 210 configured to unlock the recliner 41, a legrest unlocking first lever 220 and a legrest unlocking second lever 230 configured to unlock the legrest locking device 51, and a connection lever 240 connected between the recliner lever 210 and the legrest unlocking first lever 220 to move the legrest unlocking first lever 220 in the unlocking direction together when the recliner lever 210 moves in the unlocking direction.

The recliner lever 210 is provided in a structure of having a front end arranged as a free end operable by a user and a rear end rotatably connected to an axis portion of the recliner 41.

At this time, a spring 212 configured to provide an elastic restoring force for returning the recliner lever 210 to an original position after the recliner lever 210 is pulled is connected between the rear portion of the recliner lever 210 and the legrest support frame 50.

Therefore, when the user holds and pulls the front end of the recliner lever 210 upward, the rear end of the recliner lever 210 rotates in the direction of unlocking the recliner 41, whereas when the user releases the front end of the recliner lever 210, the recliner lever 210 rotates in the direction of locking the recliner 41 again by the elastic restoring force of the spring 212.

The legrest unlocking first lever 220 is provided in a structure of having a lower end rotatably connected to the axis portion of the legrest locking device 51, and an upper end formed with a guide pin 221 formed to protrude therefrom.

The connection lever 240 is provided in a structure of having a front end hinge-connected to the recliner lever 210, and a rear end formed with a guide hole 241 into which the guide pin 221 is inserted to be slidably movable.

At this time, when the guide pin 221 of the legrest unlocking first lever 220 is maintained in a state of being positioned at the backmost side of the guide hole 241 of the connection lever 240, the legrest locking device 51 is maintained in the locking state.

Figure 4:
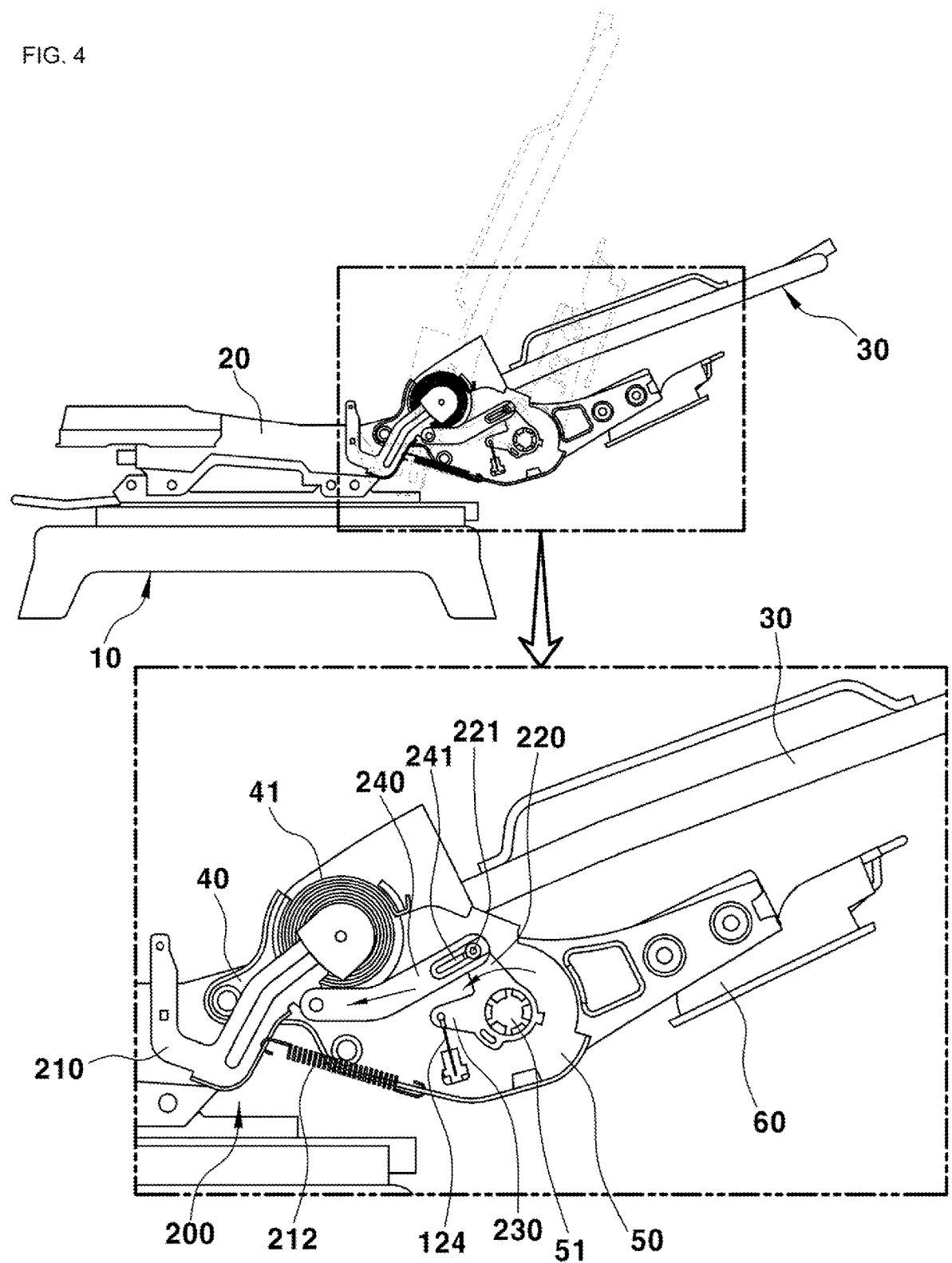
FIG. 4 is a side diagram illustrating a state where a seatback frame and a legrest frame of the vehicle seat according to an exemplary embodiment of the present disclosure are simultaneously reclined.

Therefore, when the user holds and pulls the front end of the recliner lever 210 upward, as illustrated in FIG. 4, the rear end of the recliner lever 210 pulls the connection lever 240 while rotating in the front direction of unlocking the recliner 41, and successively, also pulls the guide pin 221 positioned at the backmost side of the guide hole 241 of the connection lever 240 forward, such that the legrest unlocking first lever 220 rotates in the direction of unlocking the legrest locking device 51.

Therefore, when both the recliner 14 and the legrest locking device 51 are unlocked, as illustrated in FIG. 4, the seatback frame 30 and the legrest frame 60 may be reclined backward or forward together.

On the other hand, when the user releases the front end of the recliner lever 210, the recliner lever 210 rotates in the direction of locking the recliner 41 again by the elastic restoring force of the spring 212, and at the same time, the recliner lever 210 pushes the connection lever 240 to the original position of the rear portion. Therefore, as the force at which the connection lever 240 has pulled the guide pin 221 is released, the legrest unlocking first lever 220 also rotates in the direction of locking the legrest locking device 51 by the elastic restoring force of the spring (not illustrated), such that the guide pin 221 is positioned at the backmost side of the guide hole 241 of the connection lever 240 again.

In particular, the legrest unlocking first lever 220 is integrally formed with the legrest unlocking second lever 230 configured to unlock only the legrest locking device 51 at a predetermined angle when the legrest is deployed backward.

Further, a legrest deployment operation lever 122 connected to the legrest unlocking second lever 230 by a cable 124 is mounted on the back portion of the legrest 120 with the seat cushion function to be reclinable.

Figure 6:
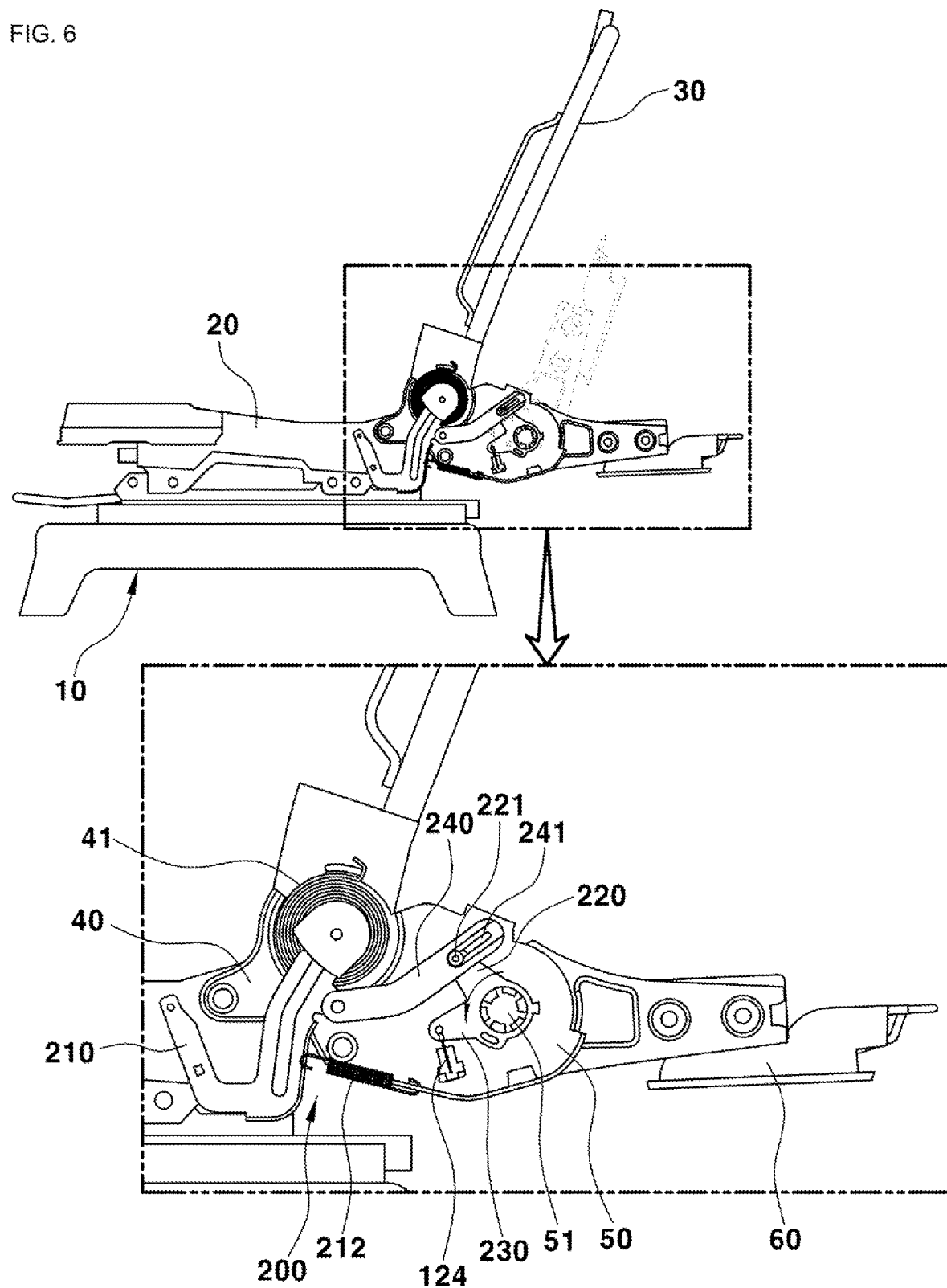
FIG. 6 is a side diagram illustrating an operation state where only the legrest frame of the vehicle seat according to an exemplary embodiment of the present disclosure is deployed backward.

Therefore, when the user operates the legrest deployment operation lever 122 for the reclining, as well illustrated in FIG. 6, the legrest unlocking second lever 230 rotates in the direction of unlocking the legrest locking device 51 while a cable 124 is pulled, such that the legrest frame 60 is deployed backward and horizontally arranged while the legrest locking device 51 is unlocked.

At this time, the guide pin 221 of the legrest unlocking first lever 220 moves forward from the guide hole 241 of the connection lever 240.

Meanwhile, the front and back portions of the front seatback 110 have a symmetric shape such that each of the front and back portions of the front seatback 110 can have a surface profile against which the upper body of the passenger may lean. As such, not only the passenger seated on the front seat cushion 100 may comfortably lean the upper body on the front portion of the front seatback 110, but also the passenger seated on the legrest 120 with the seat cushion function may lean the upper body on the back portion of the front seatback 110.

Further, a shield cover 130 configured to cover the seat cushion frame 20 and its neighboring parts to be invisible from the outside is mounted on a circumferential portion of the front seat cushion 100.

In particular, an armrest part 132 having the shape and height in which the passenger may place the arm may be integrally formed on rear portions of both sides of the shield cover 130, thereby providing convenience capable of comfortably placing the arm when the passenger is seated.

Here, an example of operating the seat having the above configuration will be described in more detail as follows.

Figure 5:
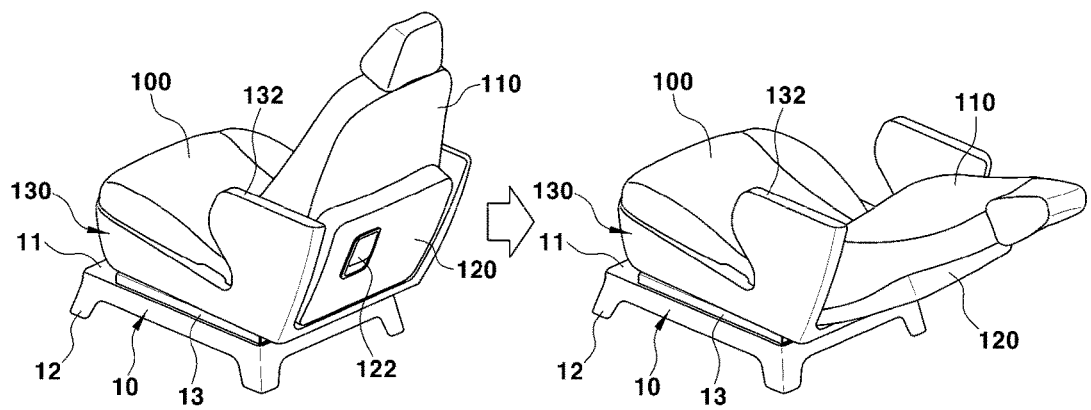
FIG. 5 is a perspective diagram illustrating a state where a front seatback and the legrest of the vehicle seat according to an exemplary embodiment of the present disclosure are simultaneously reclined.

FIG. 4 is a side diagram illustrating a state where the seatback frame and the legrest frame of the vehicle seat according to an exemplary embodiment of the present disclosure are simultaneously reclined, and FIG. 5 is a perspective diagram illustrating a state where the front seatback and the legrest of the vehicle seat according to an exemplary embodiment of the present disclosure are simultaneously reclined.

As illustrated in FIG. 4, when the user holds and pulls the front end of the recliner lever 210 upward, the rear end of the recliner lever 210 rotates in the direction of unlocking the recliner 41.

At the same time, the recliner lever 210 pulls the connection lever 240, and the guide pin 221 positioned at the backmost side of the guide hole 241 of the connection lever 240 is pulled forward, such that the legrest unlocking first lever 220 rotates in the direction of unlocking the legrest locking device 51.

Therefore, when both the recliner 41 and the legrest locking device 51 are unlocked, as illustrated in FIG. 4, when the user holds and pulls the front end of the recliner lever 210 upward, the rear end of the recliner lever 210 rotates in the direction of unlocking the recliner 41, whereas when the user releases the front end of the recliner lever 210, the recliner lever 210 rotates in the direction of locking the recliner 41 again by the elastic restoring force of the spring 212.

The legrest unlocking first lever 220 is provided in a structure of having the lower end rotatably connected to the axis portion of the legrest locking device 51, and the upper end formed with the guide pin 221 formed to protrude therefrom.

The connection lever 240 is provided in a structure of having the front end hinge-connected to the recliner lever 210, and the rear end formed with the guide hole 241 into which the guide pin 221 is inserted to be slidably movable.

At this time, when the guide pin 221 of the legrest unlocking first lever 220 is maintained in a state of being positioned at the backmost side of the guide hole 241 of the connection lever 240, the legrest locking device 51 is maintained in the locking state.

Therefore, when the user holds and pulls the front end of the recliner lever 210 upward, as well illustrated in FIG. 4, the rear end of the recliner lever 210 pulls the connection lever 240 while rotating in the front direction of unlocking the recliner 41, and successively, also pulls the guide pin 221 positioned at the backmost side of the guide hole 241 of the connection lever 240 forward, such that the legrest unlocking first lever 220 rotates in the direction of unlocking the legrest locking device 51.

Therefore, when both the recliner 41 and the legrest locking device 51 are unlocked, as illustrated in FIG. 4, the seatback frame 30 and the legrest frame 60 may be reclined backward or forward together.

Further, when the seatback frame 30 and the legrest frame 60 are reclined backward together, as illustrated in FIG. 5, in the appearance of the seat, the front seatback 110 having the seatback frame 30 embedded therein and the legrest 120 having the legrest frame 60 embedded therein are reclined backward together.

Therefore, the passenger seated on the front seat cushion 100 may take a comfortable posture while leaning the upper body on the front seatback 110 reclined backward.

Figure 7:
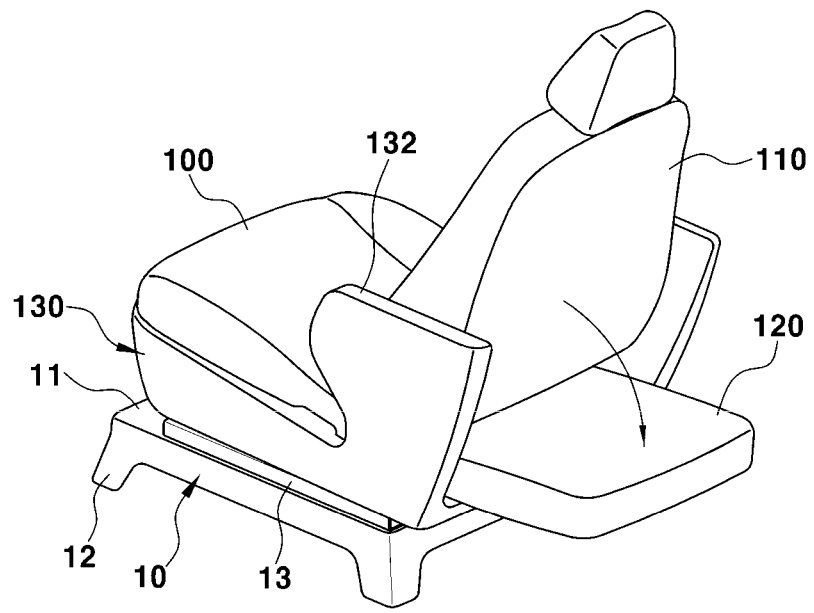
FIG. 7 is a perspective diagram illustrating a state where the legrest with the seat cushion function of the vehicle seat according to an exemplary embodiment of the present disclosure is deployed backward.

FIG. 6 is a side diagram illustrating an operation state where only the legrest frame of the vehicle seat according to an exemplary embodiment of the present disclosure is deployed backward, and FIG. 7 is a perspective diagram illustrating a state where the legrest 120 with the seat cushion function of the vehicle seat according to an exemplary embodiment of the present disclosure is deployed backward.

When the user (the passenger seated on the rear seat) operates the legrest deployment operation lever 122 for the reclining to use the legrest 120, as well illustrated in FIG. 6, the legrest unlocking second lever 230 rotates in the direction of unlocking the legrest locking device 51 while the cable 124 is pulled, such that the legrest frame 60 is deployed backward and horizontally arranged while the legrest locking device 51 is unlocked.

At this time, only the guide pin 221 of the legrest unlocking first lever 220 moves forward from the guide hole 241 of the connection lever 240, and the connection lever 240 and the recliner lever 210 do not move.

Further, when the legrest frame 60 is reclined backward together, as illustrated in FIG. 7, in the appearance of the seat, the legrest 120 having the legrest frame 60 embedded therein is deployed backward and horizontally arranged.

Therefore, the passenger seated on the rear seat may stretch out the leg to place and support the calf and foot portions on the legrest 120, thereby taking the comfortable resting posture while distributing the body pressure as much as possible.

Figure 8:
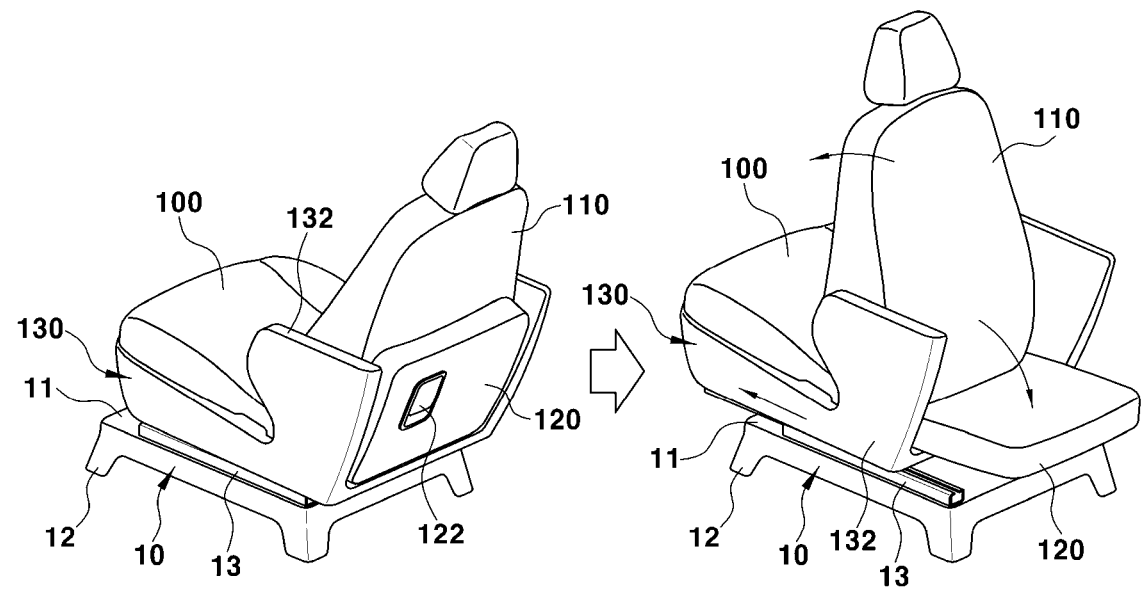
FIG. 8 is a perspective diagram illustrating a state where the front seatback is reclined forward while the entire seat is moved forward and adjusted such that a passenger may be seated on the legrest with the seat cushion function of the vehicle seat according to an exemplary embodiment of the present disclosure.

FIG. 8 is a perspective diagram illustrating a state where the front seatback is reclined forward while the entire seat is moved forward and adjusted such that the passenger may be seated on the legrest with the seat cushion function of the vehicle seat according to an exemplary embodiment of the present disclosure.

The legrest 120 may be used as the seat cushion in a state where the legrest 120 is horizontally deployed backward.

To this end, to secure the seating space for the legrest 120 with the seat cushion function, as illustrated in FIG. 8, the user moves and adjusts the entire seat forward, and reclines the front seatback 110 forward.

Since the movable rail 23 mounted under the seat cushion frame 20 may be moved along the fixed rail 13 mounted on the support frame 10, the entire seat may be easily moved forward and adjusted.

Further, when the user holds and pulls the recline lever 210 upward, the recliner lever 210 may rotate in the front direction of unlocking the recliner 41, thereby easily reclining the front seatback 110 forward.

At this time, as illustrated in FIG. 6, since the guide pin 221 is in a state of being positioned at the frontmost side of the guide hole 241 of the connection lever 240, the recliner lever 210 and the connection lever 240 do not interfere with the legrest unlocking first lever 220 or the like and may be easily rotated forward.

Therefore, the user may be seated on the legrest 120 with the seat cushion function while facing the passenger seated on the rear seat, and at the same time, lean the upper body on the front seatback 110 reclined forward, thereby implementing the seat position for the conversation mode with the passenger seated on the rear seat, and providing the comfortable seating space for infants who need adult protection.

What is claimed is:

1. A vehicle seat comprising:
   a support frame having a predetermined height and mounted on a floor panel;
   a front seat cushion having a seat cushion frame mounted on the support frame so as to be movable forward or backward;
   a front seatback having a seatback frame connected to the seat cushion frame so as to be reclinable;
   a legrest support frame connected to a recliner frame disposed under the seatback frame;
   a legrest frame fastened to the legrest support frame so as to be deployable backward; and
   a legrest with a seat cushion mounted on the legrest frame, and mounted on a back portion of the front seatback so as to be deployable,
   wherein front and back portions of the front seatback have a symmetric shape to each other such that each of the front and back portions of the front seatback has a surface profile against which an upper body of a passenger leans.

2. The vehicle seat of claim 1, further comprising: a lever device interlockably connected to a recliner mounted on the recliner frame and a legrest locking device mounted on the legrest support frame.

3. The vehicle seat of claim 2,
   wherein the lever device comprises:
   a recliner lever having a front end arranged as a free end operable by a user, and a rear end rotatably connected to the recliner;
   a legrest unlocking first lever having a lower end rotatably connected to the legrest locking device, and an upper end on which a guide pin is disposed; and
   a connection lever having a front end hinge-connected to the recliner lever, and a rear end including a guide hole into which the guide pin is inserted so as to be slidably movable.

4. The vehicle seat of claim 3,
   wherein a spring configured to provide an elastic restoring force for returning the recliner lever to an original position after the recliner lever is pulled is connected between a rear portion of the recliner lever and the legrest support frame.

5. The vehicle seat of claim 3,
   wherein the legrest unlocking first lever is integrally formed with a legrest unlocking second lever at a predetermined angle for unlocking only the legrest locking device when the legrest is deployed backward.

6. The vehicle seat of claim 5,
   wherein a legrest deployment operation lever connected to the legrest unlocking second lever by a cable is mounted on a back portion of the legrest so as to be reclinable.

7. The vehicle seat of claim 1,
   wherein a fixed rail is mounted on the support frame, and a movable rail that is fastened to the fixed rail so as to be movable forward or backward is mounted under the seat cushion frame.

8. The vehicle seat of claim 1,
   wherein a shield cover covering a seat cushion frame is mounted on a circumferential portion of the front seat cushion.

9. The vehicle seat of claim 8,
   wherein an armrest part having a shape in which a passenger places an arm is integrally formed on rear portions of both sides of the shield cover.

10. A vehicle seat comprising:
    a support frame having a predetermined height and mounted on a floor panel;
    a front seat cushion having a seat cushion frame mounted on the support frame so as to be movable forward or backward;
    a front seatback having a seatback frame connected to the seat cushion frame so as to be reclinable;
    a legrest support frame connected to a recliner frame disposed under the seatback frame;
    a legrest frame fastened to the legrest support frame so as to be deployable backward; and
    a legrest mounted on a back portion of the front seatback so as to be deployable,
    wherein the legrest has a seat cushion mounted on the legrest frame, and the vehicle seat is configured to move forward and the front seatback is configured to be reclined forward such that a seating space for the legrest is secured.

* * * * *